(12) United States Patent
Damkjaer

(10) Patent No.: US 6,390,288 B1
(45) Date of Patent: May 21, 2002

(54) FEED APPARATUS

(75) Inventor: Poul Erik Damkjaer, Vejle (DK)

(73) Assignee: Uni-Chains A/S, Vejle (DK)

( * ) Notice: Subject to any disclaimer, the term of this patent is extended or adjusted under 35 U.S.C. 154(b) by 0 days.

(21) Appl. No.: 09/567,760

(22) Filed: May 9, 2000

(51) Int. Cl.$^7$ ............................................... B65G 23/06
(52) U.S. Cl. ..................................... 198/834; 198/853
(58) Field of Search ................................. 198/834, 853

(56) References Cited

U.S. PATENT DOCUMENTS

| | | | |
|---|---|---|---|
| 3,724,285 A | 4/1973 | Lapeyre | 72/243 FC |
| 4,051,949 A | 10/1977 | Lapeyre | 198/853 |
| 4,171,045 A | 10/1979 | Lapeyre | 198/853 |
| 4,925,016 A | * 5/1990 | Lapeyre | 198/834 |
| 5,040,670 A | 8/1991 | Mendoza | 198/834 |
| 5,213,203 A | 5/1993 | Kinney et al. | 198/850 |
| 5,586,643 A | * 12/1996 | Zabron et al. | 198/853 |
| 5,613,597 A | * 3/1997 | Palmaer et al. | 198/853 |
| 5,706,934 A | * 1/1998 | Palmaer et al. | 198/853 |
| 5,791,455 A | * 8/1998 | Clopton | 198/834 X |
| 6,148,990 A | * 11/2000 | Lapeyre et al. | 198/853 X |

FOREIGN PATENT DOCUMENTS

GB    2127373    9/1983

* cited by examiner

Primary Examiner—Stephen T. Gordon
Assistant Examiner—Lori L Coletta
(74) Attorney, Agent, or Firm—Antonelli, Terry, Stout & Kraus, LLP

(57) ABSTRACT

A feed apparatus (1) comprising a conveyor belt (2), the conveyor belt (2) comprising modules (3) with an upper (4) and a lower (5) surface, the modules (3) comprising hinge eyes (7) pivotally hinged to each other perpendicular to the feed direction. The feed apparatus (1) comprises at least one rotatable and toothed driving wheel (8) meshed with the conveyor belt (2), with the pressure receiving surface (10) of the teeth wholly or partially in contact against at least the outer surface (13) of its own hinge eye (7). Therefore an optimum force transmission to the belt itself is achieved, which occurs through the teeth of the sprocket wheel applying driving force at the hinge eyes, thus making the force transmission occur close to the center line of the axis of the hinge eyes. There is a good lateral steering of the belt, so that the risk that the belt hops off the toothed wheel is minimized.

36 Claims, 2 Drawing Sheets

FEED APPARATUS

BACKGROUND OF THE INVENTION

1. Field of the Invention

The invention concerns a feed apparatus comprising a conveyor belt, the conveyor belt comprising modules with an upper and a lower surface, the modules having hinge eyes pivotally hinged to each other perpendicular to a feed direction, and at least one rotatable and toothed driving wheel meshed with the conveyor belt.

2. Description of the Prior Art

EP 0 380 203 discloses a feed apparatus comprising a toothed wheel and a belt, and where the toothed wheel drives the belt forward by means of recesses which grip into a transverse rib on the undermost surface of the belt. The sprocket wheel thus exerts a force on the diagonal surface of which the side of the middle rib is formed, so that as soon as there is a strain on the belt an upward-pressing of the belt up over the tooth will take place. The risk that the belt hops totally off the toothed wheel is significantly great. There is thus a relatively poor engagement between belt and sprocket wheel.

Besides, there is no lateral guiding of the belt, which is sufficiently expedient in that a rib placed between the teeth serves as a lateral guide, so that the belt does not become displaced sideways, but the function of the rib itself causes meat remains and the like to become embedded between the teeth. The only possible method of cleaning these remains is through use of a high pressure cleaner, which is very difficult.

Finally, the belt lays flat when running back, thus not enabling fluid to be automatically drained, since the lower surface of the belt is totally flat.

SUMMARY OF THE INVENTION

The present invention provides a feed apparatus which is not encumbered with the disadvantages of the known system, and where it is possible to achieve an optimum force transmission to the belt itself, which will occur by the teeth of the sprocket wheel achieving origin of force at the hinge eyes, thus enabling the force transmission to materialize close to the center line of the axis of the hinge eyes, in the same way enabling a favorable lateral steering of the belt, so that the risk that the belt hops off the toothed wheel is minimized.

This object is achieved with a feed apparatus where the pressure receiving surface of the teeth wholly or partially has contact against at least the outer surface of its own hinge eye.

The feed apparatus works by the toothed wheels gripping inward in the outer surface of the modules, in that the teeth are formed in such a manner which enables their pressure receiving surface, that is the surface which under rotation of the toothed wheel presses against the belt, to press against the surface of the hinge eyes, and thus a force transmission takes place directly to the belt. The belt can withstand considerable stresses, all the way up to 2500 Newtons, whereas the known belt systems only allow stress influences of 1200–1300 Newtons.

Since the teeth are engaged against the hinge eyes, the pressure on the belt will in all cases remain approximately unchanged, so that the belt will not hop off, since there is not a force-arm relationship which would otherwise be in affect in the case of known systems.

By providing a feed apparatus according to the invention, there is sufficient room for the teeth of the toothed wheel between the hinge eyes, and since there is room for the teeth between the hinges because of the diagonal surfaces, a favorable pressure surface for the sprocket wheel is achieved, which simultaneously sideway-steers the belt.

A feed apparatus according to the invention provides an optimization of the sideway-steering.

A feed apparatus according to the invention provides a pressure receiving surface against the hinge eyes which is practically perpendicular, so there is no pressure on the belt in the perpendicular direction, but only forward. Therefore, it is avoided that the belt passes over the teeth upon application of stress, so that the belt hops off.

A feed apparatus according to the invention provides an optimization of the interaction between the toothed wheel and hinge eyes, so that the force transmission from the toothed wheel occurs close to the center line of the axis of the hinge eyes.

A feed apparatus according to the invention provides room for a rib on the undermost surface of the belt, the rib extending along the center line of the module and parallel with the lengthwise sides which facilitates drainage of liquid from a lower surface of the modules and further strengthens the belt.

A feed apparatus according to the invention provides optimum sideways-steering, using a loose fit of the toothed wheel in the space between the hinge eyes, though not large enough so that a twisting of the toothed wheel or the belt will be displaced from a position between the two hinge eyes.

A feed apparatus according to the invention provides a strengthening of the belt itself.

A feed apparatus according to the invention provides sufficient space for the teeth.

BRIEF DESCRIPTION OF THE DRAWINGS

The invention will now be explained in more detail with reference to the drawing, where.

DESCRIPTION OF THE PREFERRED EMBODIMENTS OF THE INVENTION

Figure 1:
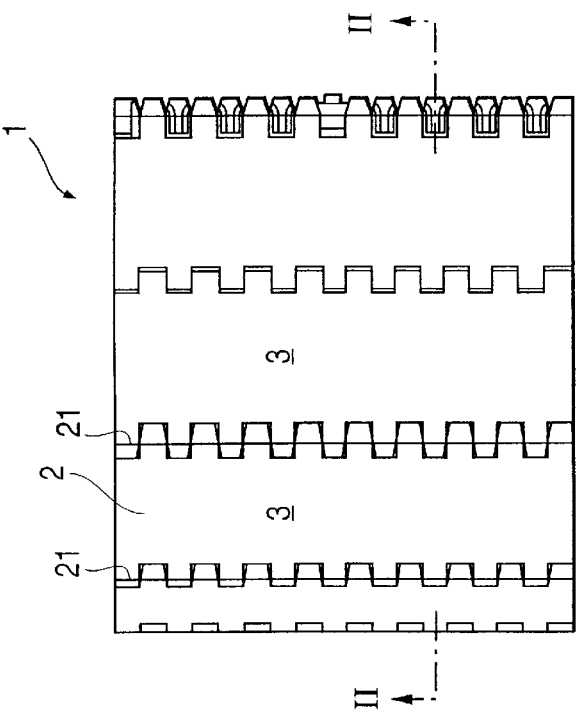
FIG. 1 shows a conveyor belt seen from above, where it is fed around a toothed wheel.

FIG. 1 shows a feed apparatus seen from above, where a cross-section of the conveyor belt 2 is seen, which is composed of rectangular modules 3, which on the length sides are pivotally hinged to each other by hinge eyes 7, so that a hinge eye on the one length side of one of the rectangular modules is surrounded by two corresponding hinge eyes on the adjoining module, the hinge eyes in this way being connected by a parallel positioned pin/axle 21 in the axis, around which the two modules can revolve. The hinge eyes 7 are alternately related to the first and the second modules along the radial axis.

Figure 2:
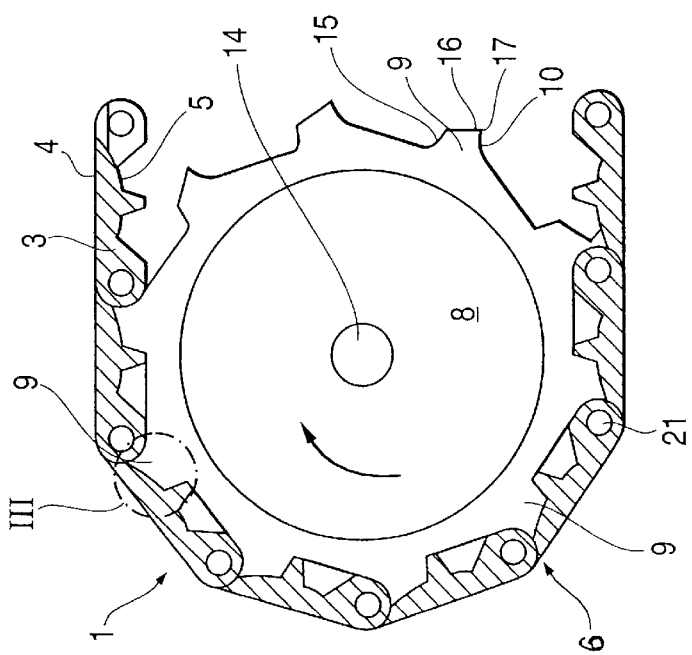
FIG. 2 shows the conveyor belt seen from the side, along the line II—II in FIG. 1, and where the mutual relations of the belt and the toothed wheel are shown.

FIG. 2 shows a cross section along the line II—II in FIG. 1, and where the feed apparatus 1 is seen from the side, the feed apparatus comprising the mentioned conveyor belt 2 with an upper surface 4 and a lower surface 5 as well as a driving wheel 8 having drive axis 14, the driving wheel 8 comprising teeth 9 in the periphery, the teeth all being identical and positioned with the same distance between them. The teeth 9 grip at the undermost surface of the conveyor belt 2, in that the pressure receiving surface 10 of the driving wheel 8, in other words the surface which transfers a force to the conveyor belt during rotation of the driving wheel 8, has direct contact with the outer surface of the hinge eyes, as will be explained further in the following.

Figure 3:
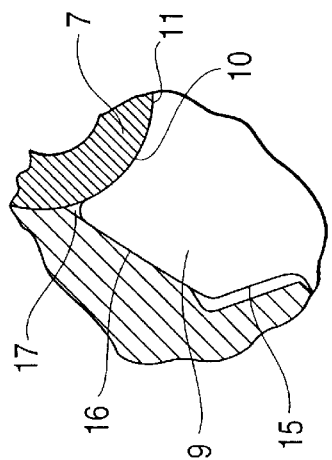
FIG. 3 shows a detailed drawing from FIG. 2.

The modules can, as previously mentioned, be rotated around each other by means of pins/axles 21, and thus connect the separate modules 3 with each other. As shown in FIG. 3 in detail, the teeth 9 include a pressure receiving surface 10, which is substantially congruent in form with the outer peripheral surface of the hinge eyes 7, that it contacts during driving of the conveyor belt 2, and whereby it is ensured that the force is transmitted close to the [center] center line of the pins.

The pressure receiving surface 10 is thus a concave area with respect to the rotational direction of the driving wheel, and where the concavity has the same radius of curvature as the radius of curvature of surface 11 of the hinge eyes 7. In a certain area, the pressure receiving surface 10 will assume an angle from the toothed wheel of 0–10°. The pressure receiving surface 10 evolves outward in a demarcation edge 17, which is demarcated in such a manner that the pressure receiving surface 10 on the one side and a demarcation surface 16 form an acute angle.

The surface 16 of wheel 8 engages the lower surface 5 of the modules 3 during driving. The surface 5 has a part which slopes inward away from the surface 4 to increase the thickness of the modules 3 toward the middle where the ribs 19 are located as discussed below. The surface 5 contacts the demarcation surface 16 during driving as illustrated in FIGS. 2 and 3.

The demarcation surface 16 is plane and continuously parallel with the outermost surface of the conveyor belt 2, so that when the tooth is engaged with the hinge eyes 7, the demarcation surface 16 rests in a plane corresponding to the outermost side of the conveyor belt 2, which is why the conveyor belt expediently has a form, which will be explained in detail with reference to FIG. 6.

The demarcation surface 16 proceeds thereafter in a surface 15 positioned opposite the pressure receiving surface 10, and the surface of which is now being called the second surface of the tooth, where this second surface of this tooth and the demarcation surface 16 form an obtuse angle, where they meet. All teeth 18 are identical, and between the teeth the surface 12 is plane and [extending] extends linearly, so that the greatest radial distance from the surface 12 is closest to the pressure receiving surface 10, and the closest surface to the surface 12 is the second surface 15.

Figure 5:
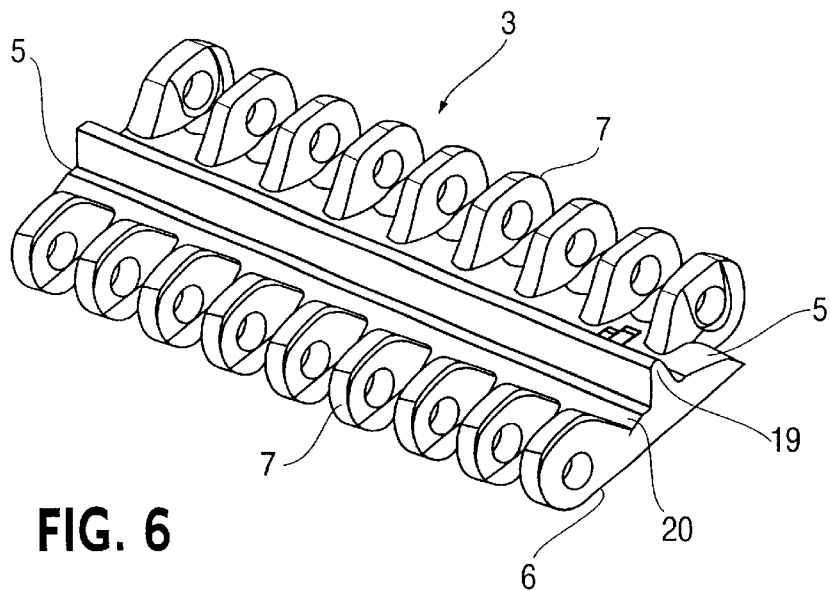
FIG. 5 shows the module seen from the undermost surface.
Figure 6:
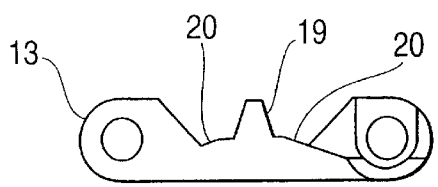
FIG. 6 shows the module shown in FIG. 5 seen from one of the end surfaces.

The undermost surface of the modules is depicted in FIGS. 5 and 6. FIG. 5 shows a module seen from the undermost surface comprising one with the longitudinal parallel progressing ribs 19, the ribs 19 being positioned along the middle axis of the module. Each rib 19 is formed in such a manner that walls thereof converge away from the lower surface 5 of the module. The lower surface 5 of the module is slanted where opposed to the demarcation surface 16, so that the lower surface is formed mirror-inverted around the rib, and where this surface slopes a decreasing in thickness of the module occurs away from the rib. With this construction, a surface congruent with the demarcation surface 16 of the driving wheel 8, whereby a suitable transmission of pressure is achieved during stress influence of the belt during operation.

The form of the hinge eyes 7 is clearly depicted in FIG. 5 and is substantially identical with the modules, which are known from EP 0 380 203. An additional aid toward stability of the meshing of the driving wheel in the modules is that the teeth 9 have their demarcation edge 17 and parts of the demarcation surface 16 situated between two parallel placed module eyes 7, and have a width corresponding to 80–90% of this, so that the wheel can be positioned approximately between the modules and remain standing without any risk of falling. In this way, a very good lateral stability of the belt is achieved.

FIG. 6 shows the module as shown in FIG. 5 seen from one of the sides and thus comprises hinge eyes 7, which have a radius of curvature 13, which substantially corresponds to the radius of curvature, which the pressure receiving surface 10 has, and as shown in FIG. 3. Under surfaces 20 slope away from the ribs 9.

Figure 4:
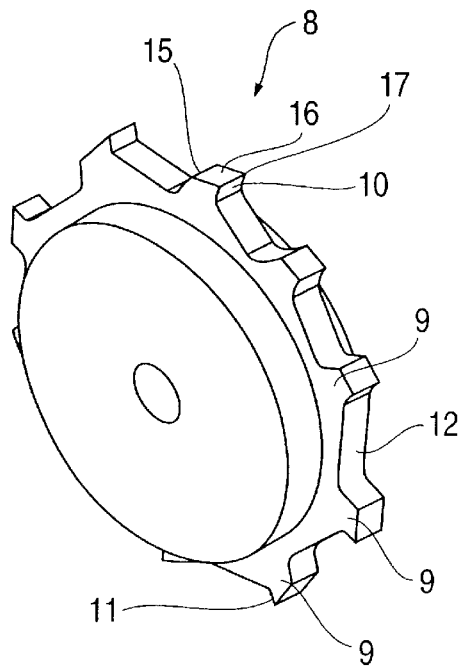
FIG. 4 shows a perspective drawing of the toothed wheel.

FIG. 4 shows a picture in perspective of the driving wheel 8 according to the invention, where the substantial detail is the mentioned teeth, which all are identical, and that these teeth as a result of their form are able to mesh in the center line of the proximity of the hinge eyes, i.e. close to the pin/axle to the center line of the modules 21, whereby the transmission of force is optimized.

Finally, the slanted surface 20 on the undermost surface of the modules causes fluid to be automatically drained away because of the slanted surface. The slanted surface also allows room for the teeth of the sprocket wheel between the hinge eyes 7, which are used as pressure receiving surface for the sprocket wheel and at the same time laterally steer the belt. The teeth 9 of the sprocket wheel 8 are formed in a such a manner that the pressure receiving surface 10 toward the hinge eyes 7 is approximately perpendicular. This means that only a forward directed pressure and not a perpendicular pressure is applied to the belt is inflicted. In this way, the belt coming over the teeth is avoided. Furthermore, the uppermost and lowermost surfaces of the belt are similar to the known belts, whereby it therefore is the undermost side as well as the sprocket wheel itself that are unique in the invention.

What is claimed is:

1. A feed apparatus comprising:
   a conveyor belt comprising modules including an upper surface, a lower surface and hinge eyes, the hinge eyes being pivotally hinged to each other perpendicular to a feed direction to form the conveyor belt and a part of the lower surface of each model sloping relative to the upper surface toward a middle point thereof with the module increasing in thickness at the part toward the middle point; and
   at least one rotatable drive wheel including driving teeth meshing with the conveyor belt, each tooth including a pressure receiving surface which contacts at least an outer surface of a hinge eye during driving of the conveyor belt and a radially sloping demarcation surface which forms an angle at a radially outermost point with the pressure receiving surface thereof with the demarcation surface contacting the part of the lower surface of one of the modules during driving.

2. A feed apparatus in accordance with claim 1, wherein the lower surface and the demarcation surface are planar where engagement there between thereof occurs.

3. A feed apparatus in accordance with claim 2, wherein:
   each tooth has another surface which extends radially outward and intersects the demarcation surface to form an obtuse angle which is radially inward from the acute angle.

4. A feed apparatus in accordance with claim 3, wherein:
the lower surface of the modules has a rib including a radially inward top surface, engaging a surface of the wheel which is located at a same radius as a base of each tooth and has two surfaces tapering outward to a radially outward base which is wider than the top surface with one of the two surfaces engaging the another surface during driving.

5. A feed apparatus according to claim 1, wherein:
the pressure receiving surfaces of the teeth form an angle between 0 to 10° with the outer surface of the hinge eye.

6. A feed apparatus according to claim 2, wherein:
the pressure receiving surfaces of the teeth form an angle between 0 to 10° with the outer surface of the hinge eye.

7. A feed apparatus according to claim 3, wherein:
the pressure receiving surfaces of the teeth form an angle between 0 to 10° with the outer surface of the hinge eye.

8. A feed apparatus according to claim 4, wherein:
the pressure receiving surfaces of the teeth form an angle between 0 to 10° with the outer surface of the hinge eye.

9. A feed apparatus according to claim 1, wherein:
each pressure receiving surface includes a surface area having a radius of curvature which is approximately identical to a radius of curvature of each hinge eye.

10. A feed apparatus according to claim 2, wherein:
each pressure receiving surface includes a surface area have a radius of curvature which is approximately identical to a radius of curvature of each hinge eye.

11. A feed apparatus according to claim 3, wherein:
each pressure receiving surface includes a surface area have a radius of curvature which is approximately identical to a radius of curvature of each hinge eye.

12. A feed apparatus according to claim 4, wherein:
each pressure receiving surface includes a surface area have a radius of curvature which is approximately identical to a radius of curvature of each hinge eye.

13. A feed apparatus according to claim 5, wherein:
each pressure receiving surface includes a surface area have a radius of curvature which is approximately identical to a radius of curvature of each hinge eye.

14. A feed apparatus according to claim 6, wherein:
each pressure receiving surface includes a surface area have a radius of curvature which is approximately identical to a radius of curvature of each hinge eye.

15. A feed apparatus according to claim 7, wherein:
each pressure receiving surface includes a surface area have a radius of curvature which is approximately identical to a radius of curvature of each hinge eye.

16. A feed apparatus according to claim 8, wherein:
each pressure receiving surface includes a surface area have a radius of curvature which is approximately identical to a radius of curvature of each hinge eye.

17. A feed apparatus according to claim 1, wherein:
a surface area of the wheel between individual teeth is slanted radially and is planar.

18. A feed apparatus according to claim 1, wherein:
a width of the demarcation surface and the pressure receiving surface substantially ranges between 80–98% of a distance between two adjacent hinge eyes on a single module.

19. A feed apparatus according to claim 1, wherein:
the angle is acute.

20. A feed apparatus in accordance with claim 19, wherein the lower surface and the demarcation surface are planar where engagement there between thereof occurs.

21. A feed apparatus in accordance with claim 20, wherein:
each tooth has another surface which extends radially outward and intersects the demarcation surface to form an obtuse angle which is radially inward from the acute angle.

22. A feed apparatus in accordance with claim 21, wherein:
the lower surface of the modules has a rib including a radially inward top surface, engaging a surface of the wheel which is located at a same radius as a base of each tooth and has two surfaces tapering outward to a radially outward base which is wider than the top surface with one of the two surfaces engaging the another surface during driving.

23. A feed apparatus according to claim 19, wherein:
the pressure receiving surfaces of the teeth form an angle between 0 to 10° with the outer surface of the hinge eye.

24. A feed apparatus according to claim 20, wherein:
the pressure receiving surfaces of the teeth form an angle between 0 to 10° with the outer surface of the hinge eye.

25. A feed apparatus according to claim 21, wherein:
the pressure receiving surfaces of the teeth form an angle between 0 to 10° with the outer surface of the hinge eye.

26. A feed apparatus according to claim 22, wherein:
the pressure receiving surfaces of the teeth form an angle between 0 to 10° with the outer surface of the hinge eye.

27. A feed apparatus according to claim 19, wherein:
each pressure receiving surface includes a surface area having a radius of curvature which is approximately identical to a radius of curvature of each hinge eye.

28. A feed apparatus according to claim 20, wherein:
each pressure receiving surface includes a surface area have a radius of curvature which is approximately identical to a radius of curvature of each hinge eye.

29. A feed apparatus according to claim 21, wherein:
each pressure receiving surface includes a surface area have a radius of curvature which is approximately identical to a radius of curvature of each hinge eye.

30. A feed apparatus according to claim 22, wherein:
each pressure receiving surface includes a surface area have a radius of curvature which is approximately identical to a radius of curvature of each hinge eye.

31. A feed apparatus according to claim 23, wherein:
each pressure receiving surface includes a surface area have a radius of curvature which is approximately identical to a radius of curvature of each hinge eye.

32. A feed apparatus according to claim 24, wherein:
each pressure receiving surface includes a surface area have a radius of curvature which is approximately identical to a radius of curvature of each hinge eye.

33. A feed apparatus according to claim 25, wherein:
each pressure receiving surface includes a surface area have a radius of curvature which is approximately identical to a radius of curvature of each hinge eye.

34. A feed apparatus according to claim 26, wherein:

each pressure receiving surface includes a surface area have a radius of curvature which is approximately identical to a radius of curvature of each hinge eye.

35. A feed apparatus according to claim 19, wherein:

a surface area of the wheel between individual teeth is slanted radially and is planar.

36. A feed apparatus according to claim 19, wherein:

a width of the demarcation surface and the pressure receiving surface substantially ranges between 80–98% of a distance between two adjacent hinge eyes on a single module.

* * * * *

UNITED STATES PATENT AND TRADEMARK OFFICE
CERTIFICATE OF CORRECTION

PATENT NO. : 6,390,288 B2
DATED : May 21, 2002
INVENTOR(S) : Damkjaer

It is certified that error appears in the above-identified patent and that said Letters Patent is hereby corrected as shown below:

<u>Title page,</u>
Insert:
-- [63] Related U.S. Application Data, Danish Patent Application PA 1999 01039, filed July 19, 1999 --

Signed and Sealed this

Twenty-ninth Day of October, 2002

*Attest:*

*Attesting Officer*

JAMES E. ROGAN
*Director of the United States Patent and Trademark Office*